United States Patent
Starkov

(10) Patent No.: US 11,001,416 B2
(45) Date of Patent: *May 11, 2021

(54) MARBLE-SEALED CONTAINER

(71) Applicant: Vladimir V. Starkov, Geneva, IL (US)

(72) Inventor: Vladimir V. Starkov, Geneva, IL (US)

(73) Assignee: EFFRVS, LLC, Geneva, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,476

(22) Filed: Sep. 30, 2019

(65) Prior Publication Data

US 2020/0024037 A1    Jan. 23, 2020

Related U.S. Application Data

(63) Continuation of application No. 15/898,759, filed on Feb. 19, 2018, now Pat. No. 10,450,110.

(60) Provisional application No. 62/462,582, filed on Feb. 13, 2017.

(51) Int. Cl.
*B65D 39/06* (2006.01)
*B65D 41/04* (2006.01)
*B65D 51/28* (2006.01)
*G06Q 30/02* (2012.01)

(52) U.S. Cl.
CPC ............. *B65D 39/06* (2013.01); *B65D 41/04* (2013.01); *B65D 51/2878* (2013.01); *B65D 51/2885* (2013.01); *G06Q 30/0201* (2013.01); *G06Q 30/0205* (2013.01)

(58) Field of Classification Search
CPC .... B65D 39/06; B65D 41/04; B65D 51/2878; B65D 51/2885
USPC ........................................................ 340/571
See application file for complete search history.

(56) References Cited

U.S. PATENT DOCUMENTS

| | | | | |
|---|---|---|---|---|
| 10,450,110 | B2* | 10/2019 | Starkov | B65D 41/04 |
| 2004/0233054 | A1* | 11/2004 | Neff | G06Q 20/203 |
| | | | | 340/539.1 |
| 2009/0072951 | A1* | 3/2009 | Alberth, Jr. | H04B 5/0062 |
| | | | | 340/10.41 |
| 2015/0197366 | A1* | 7/2015 | Chapin | B65D 51/22 |
| | | | | 220/254.1 |
| 2016/0025545 | A1* | 1/2016 | Saltzgiver | G01F 23/2962 |
| | | | | 73/304 C |

* cited by examiner

*Primary Examiner* — Kerri L McNally
(74) *Attorney, Agent, or Firm* — K&L Gates LLP

(57) ABSTRACT

The present disclosure is directed to a marble-sealed bottle that preserves the marble features yet allows for easy opening, re-closing, and unobstructed pouring of the content stored in the bottle. In addition, the disclosure provides a mobile application that improves consumer engagement with the product and facilitates collection of certain information about the product users and individuals connected to them via social networks or similar software applications.

8 Claims, 5 Drawing Sheets

MARBLE-SEALED CONTAINER

CROSS-REFERENCE TO RELATED APPLICATIONS

This application is a continuation application of U.S. patent application Ser. No. 15/898,759 filed Feb. 19, 2018, which incorporates by reference and claims the benefit of priority to U.S. Provisional Application 62/462,582 filed on Feb. 23, 2017.

BACKGROUND OF THE INVENTION

The present subject matter relates generally to a marble-sealed bottle used for beverages that has a closing design based on a sphere ("marble") that is held against a flexible seal, which is affixed to the bottle or to the bottle cap.

The "Codd bottle" was originally designed by Hiram Codd to enclose a marble and a rubber washer/gasket in the neck. The bottles were filled upside down, and the pressure of the gas (e.g., carbonation) in the bottle forced the marble against the washer, sealing in the carbonation. The bottle was pinched into a special shape to provide a chamber into which the marble was pushed after opening of the bottle, which prevents the marble from blocking the neck as the drink was poured or drank.

To open a conventional Codd bottle, a sturdy surface and substantial pressure is required in order to remove the marble by force. As such, Codd bottles are particularly difficult to open for people on the go, elderly, children, and/or people with disabilities. Not only are the conventional models difficult to open, the marble, after opening, can interfere with the pouring or drinking of the content from the bottle. Additionally, Codd bottles cannot be re-closed after opening.

Accordingly, there is a need for a marble-sealed bottle that is easier to open, re-close and is enabled for use with new types of beverages.

BRIEF SUMMARY OF THE INVENTION

The present disclosure is directed to a marble-sealed container that preserves the marble features yet allows for easy opening, re-closing, unobstructed pouring of the content stored in the bottle, and, in addition, an improved consumer engagement with the product by means of a dissolvable marble and a mobile application. It is understood that, in addition to a bottle, the present disclosure applies to any other type of packaging containing liquid (e.g., can, carton, etc.).

In an embodiment, the system includes a marble-sealed container including a container comprising a container neck extending from a container body, wherein the container neck includes an opening for dispensing the container content, wherein a marble is positioned in the container neck, wherein the marble blocks the opening in the container neck, wherein the marble is held in place by flexible flanges; a twistably removable outer cap positioned over the opening of the container neck and a portion of the container neck; a fixed cap positioned on an outer surface of the container neck, wherein the twistably removable outer cap threadably engages with the fixed cap, wherein the twistably removable outer cap is configured to be removed from the fixed cap by rotation; and a plunger extending out of the opening of the container neck, wherein upon twisting the twistably removable cap the plunger depresses into the neck container releasing the marble from the flexible flanges and the marble drops into the container body.

In an embodiment, the system includes a controller; a memory coupled to the controller, wherein the memory is configured to store program instructions executable by the controller; wherein in response to executing the program instructions, the controller is configured to: receive an activation information of a product, wherein activation information indicates the product is opened; and communicate the activation information to a business entity associated with the product and/or to a mobile device in communication with the product user.

An advantage of the present disclosure is allowing a user to easily open the marble-sealed bottle using a twisting motion. Therefore, the bottle is easily opened by children, elders, and people with disabilities without the need for a sturdy surface. The possibility to re-close the bottle after opening will provide an additional appeal for people on the go.

An advantage of the present system is providing unobstructed flow of liquid from the bottle by means of preventing the marble from touching the edges of the seal after the bottle has been opened.

Yet another advantage is incorporating consumer engagement with the product by making the marble fully or partially dissolvable in the liquid contained in the bottle. During the process of dissolution, the dissolving marble may add colors, flavors, and/or nutrients to the liquid product contained in the bottle.

Further consumer engagement with the product is achieved by a mobile application that may educate users about the product, provide entertainment and advertising content, connect the product users to the business entity associated with the product, and/or connect the product users to each other. The mobile application can be activated either by an action on the user's electronic device or by an action of the user opening the container (e.g., bottle, can, packaging, etc.).

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure is directed to a marble-sealed container that preserves the marble features yet allows for easy opening, re-closing, and unobstructed pouring of the content stored in the container. In addition, the disclosure provides for a dissolvable marble and a mobile application to improve consumer engagement with the product.

Figure 1:
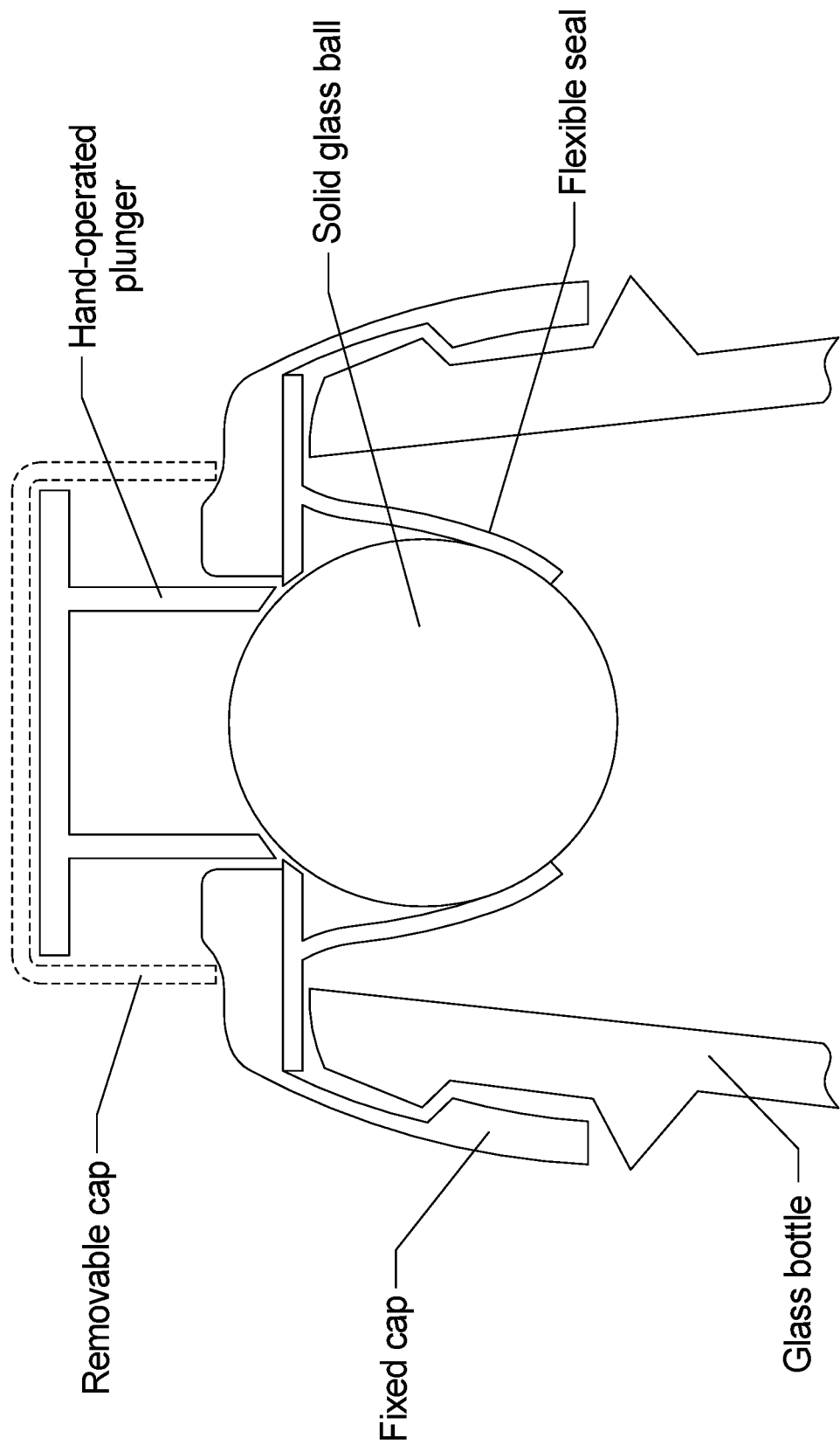
FIG. 1 is a cross-sectional view of a conventional Codd bottle.

FIG. 1 is an illustration of a conventional Codd type of bottle. As shown, the conventional Codd bottle includes a removable cap. After removal of the removable cap, the user can depress a hand-operated plunger to release the marble by pushing the marble held in place by the flexible seal flanges past the flanges and into the liquid. However, operating the plunger in this way involves substantial force and typically requires a sturdy surface for the bottle to be sat upon while opening (so the user can apply the force to open against the surface). Additionally, Codd bottles cannot be re-closed once opened.

Figure 2:
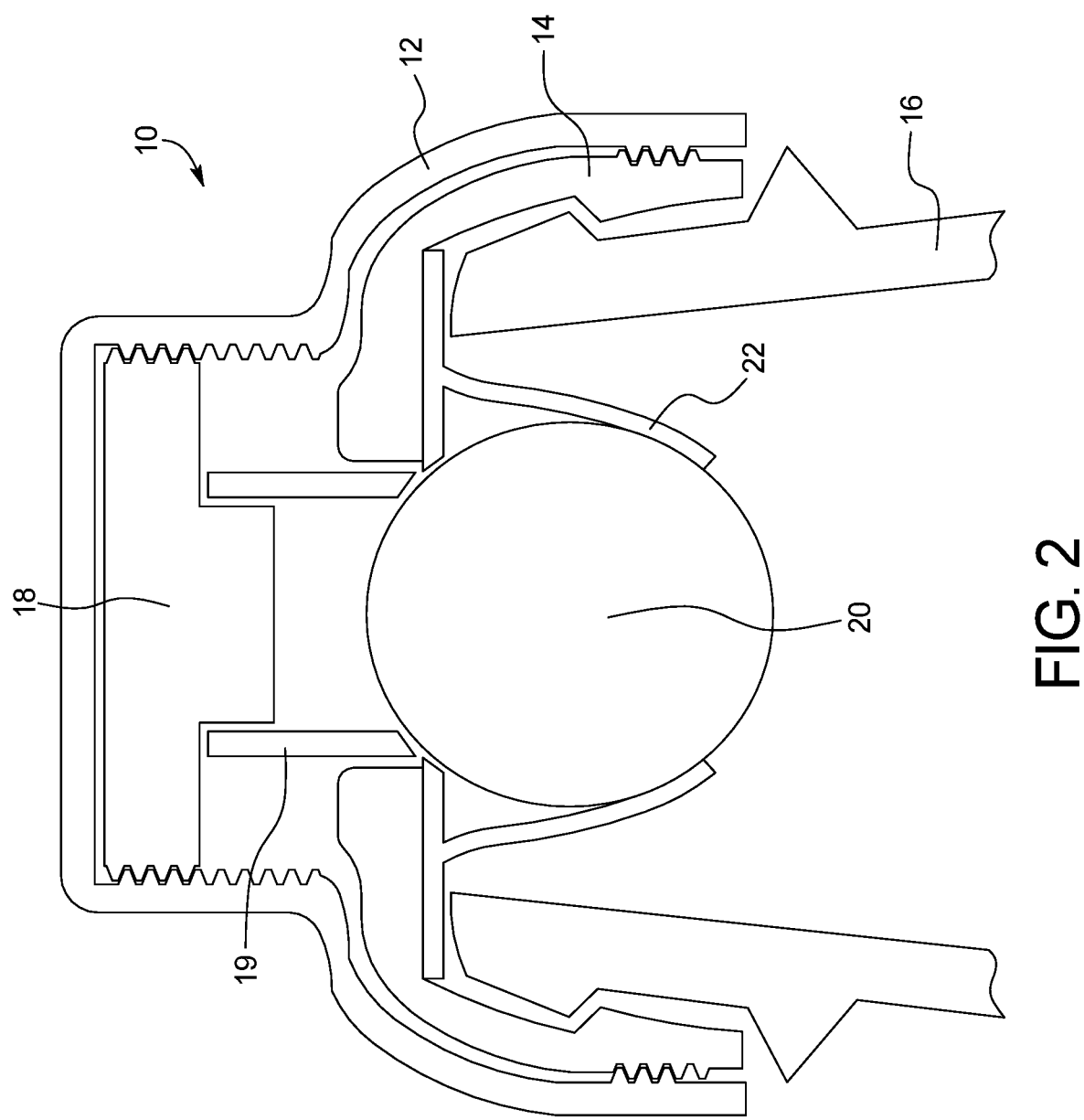
FIG. 2 is a cross-sectional view of an embodiment of the disclosed marble-sealed bottle.

FIG. 2 is an example of the disclosed marble-sealed bottle 10 including a twistable outer cap 12, wherein the twistable outer cap threadably engages with the fixed cap 14 positioned on the outer surface of the bottle neck 16. Because the removable cap in the present marble-sealed bottle can be removed by twisting, users do not need a sturdy surface to rest the bottle while force is being applied to open the bottle. Additionally, threaded cap allows a user to re-close the bottle after it has been opened.

The threaded outer cap 12 includes a one or two-piece plunger threaded in a different direction. Specifically, the outer cap can be right-handed threaded, wherein the plunger is left-handed threaded (or vice versa). In a two-piece plunger design, rotation of the outer cap 12 threadably engages rotation of the disk 18 in the opposite direction. Movement of the rotating disk 18 pushes a plunger 19 downward to depress the marble 20 being held in place by the flexible flanges 22 to eventually release the marble from its seal. In a single-piece plunger design, the entire plunger rotates and its downward motion eventually depresses and releases the marble.

Figure 3:
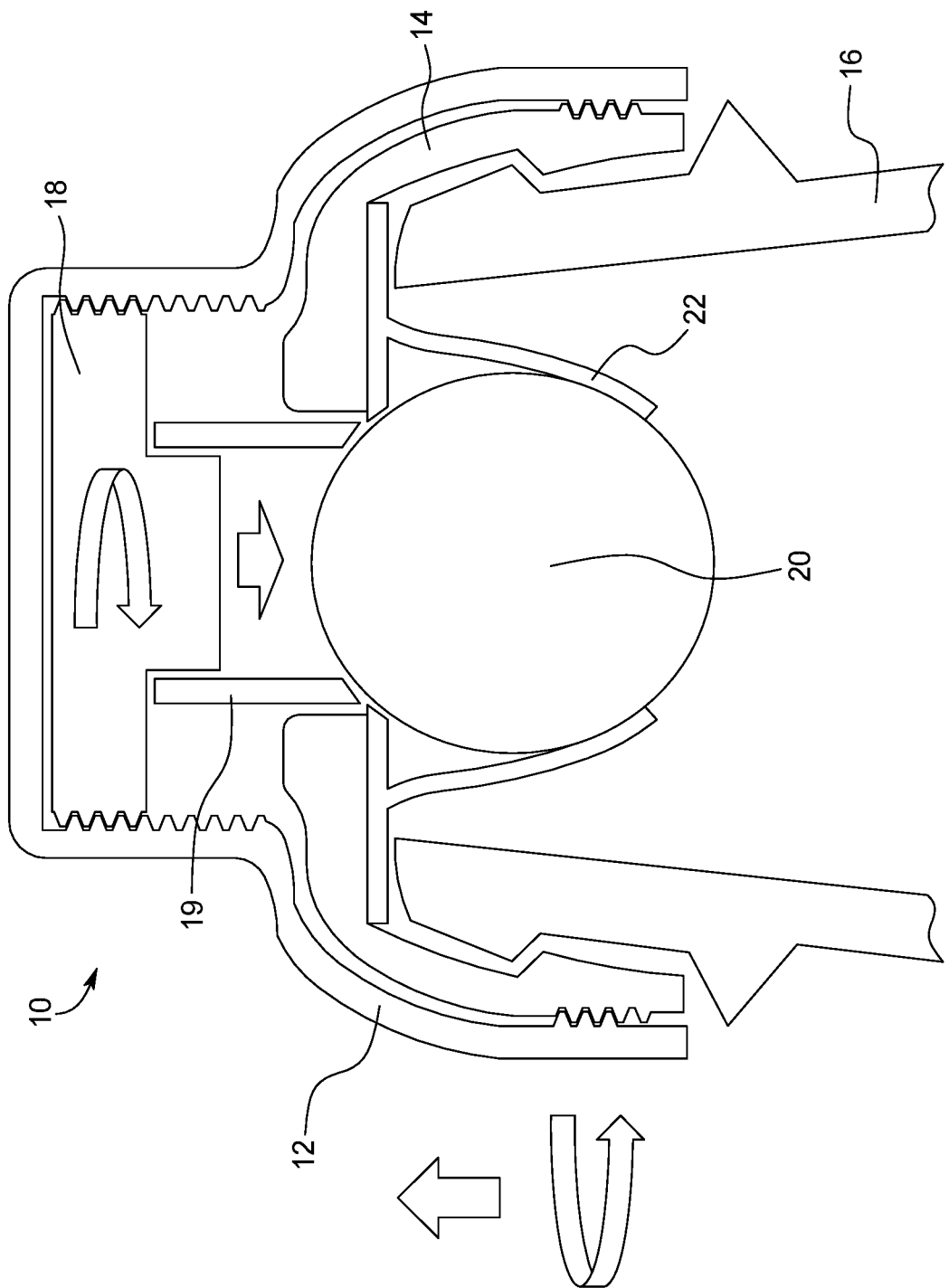
FIG. 3 is a cross-sectional view of an embodiment of the disclosed marble-sealed bottle illustrating the rotation of the various components to open the bottle.

As shown in FIG. 3, as the twistable outer cap 12 can be being rotated by the user and moves up on the thread of the fixed cap 14, the disk 18 rotates in the opposite direction on the thread within the outer cap while moving plunger 19 down in the bottle neck. The downward moving plunger eventually touches the sealing marble 20, and applies force to it. Application of force to the marble by the plunger depresses the marble past the flexible flanges 22 to allow the marble to drop into the beverage content.

Figure 4:
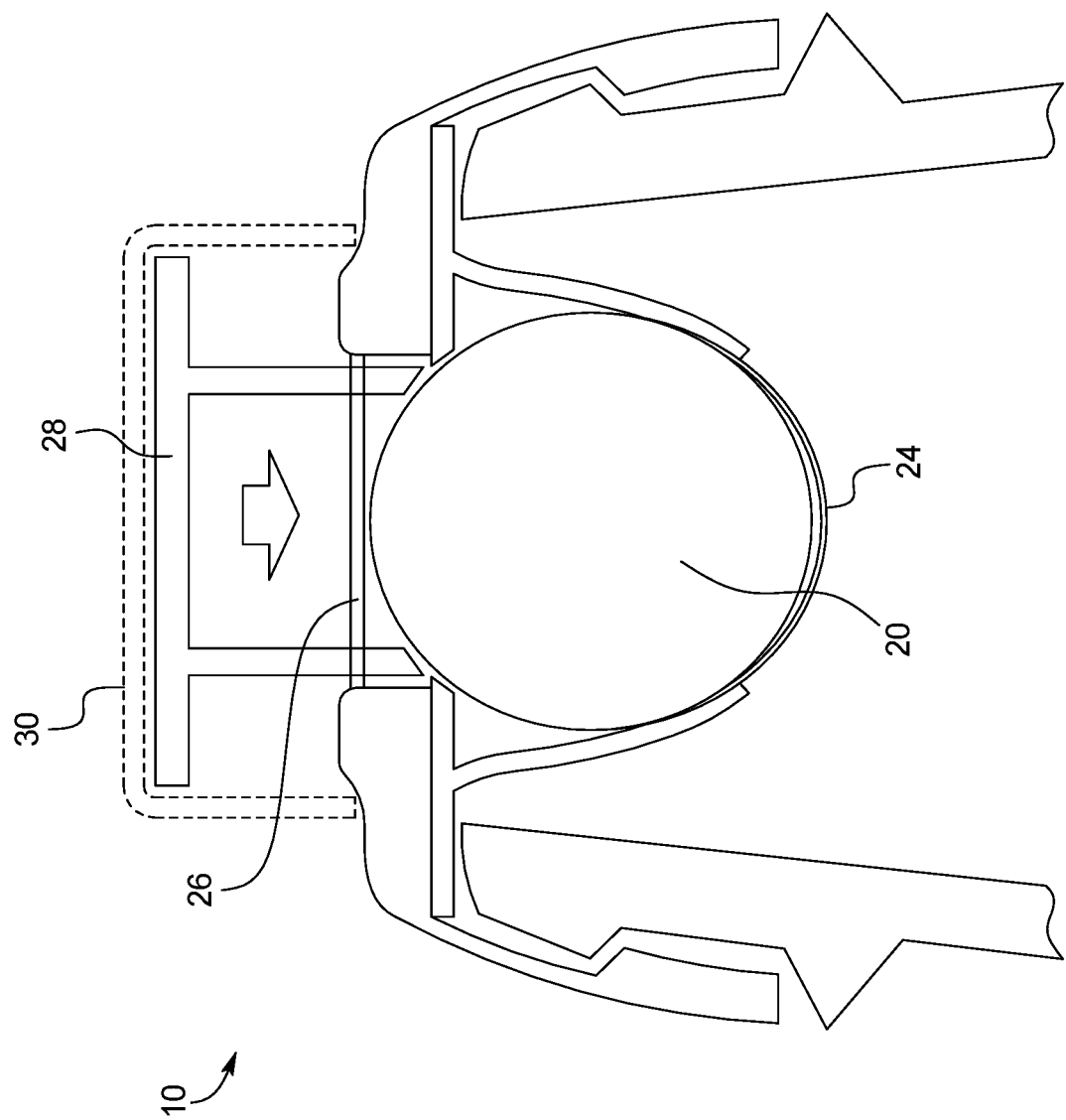
FIG. 4 is a cross-sectional view of an embodiment of the disclosed marble-sealed bottle including a grid that prevents the marble from leaving the bottle and a non-dissolvable membrane that prevents the marble from being exposed to the bottle content. The grid is combined with a hand-operated plunger.

Although FIG. 4 depicts a non-rotating plunger 28, it is understood that the plunger can be either non-rotating or rotating. The plunger can also be constructed as a single piece or consist of two pieces 18 and 19 as disclosed previously herein and depicted in FIG. 5. The advantage of a two-piece plunger is that a non-rotating part 19 can be designed to pass through the openings in the grid 26. For example, the non-rotating part of the plunger 19 can engage with the grid 26 to shift the grid downward in a way that would prevent the marble 20 from becoming re-attached to the flexible flanges 22 thereby preventing the marble from impeding the flow of the liquid contained in the bottle.

The marble 20 can be glass, plastic, metal, made of edible materials, or combinations thereof. The marble can also be solid or soluble in the liquid contained in the bottle. In an example, the marble is partially or fully soluble. In an example, as shown in FIG. 4, a non-dissolvable membrane 24 surrounds or partially surrounds the marble 20 in order to separate the portion of the surface of the dissolvable marble from the liquid contained in the bottle. Upon opening the bottle, the membrane is broken and the marble is exposed to the liquid, thereby dissolving or partially dissolving.

A dissolvable marble has a variety of advantages. First, when the marble is dissolvable upon opening the bottle, the marble no longer impedes pouring or drinking from the bottle, including the cases when a partially dissolved marble has been removed from the bottle. Second, the novelty of the dissolving marble can be appealing and entertaining to users. For example, the marble can dissolve and display a color effect in the drink content. Alternatively, or in addition to, the marble may dissolve to release additional ingredients into the beverage. In an example, the marble can dissolve to release flavors, colors, vitamins, minerals, and/or other nutrients.

Figure 5:
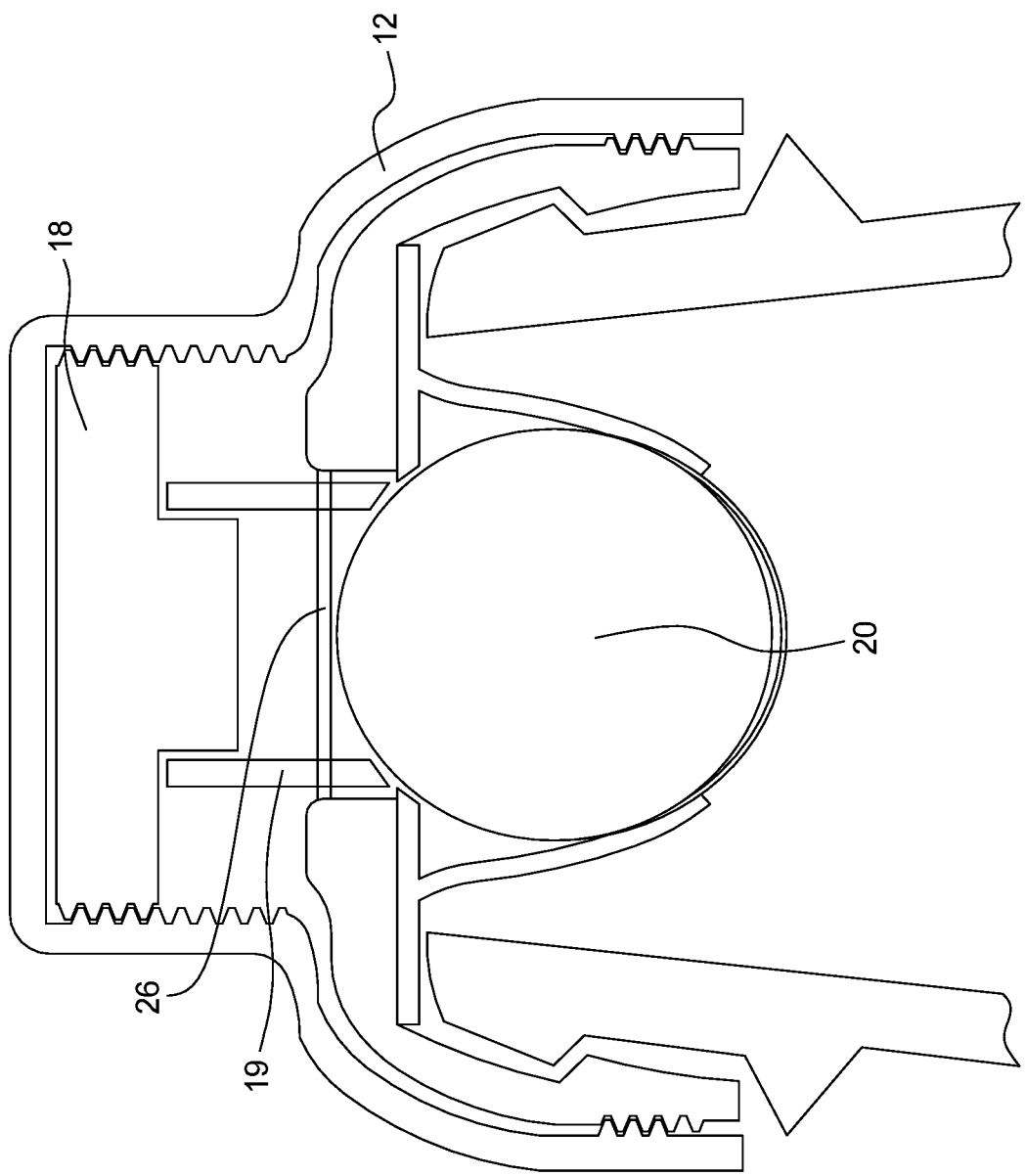
FIG. 5 is a cross-sectional view of an embodiment of the disclosed marble-sealed bottle including the disclosed grid that is combined with the plunger activated by rotation of the outer cap.

As shown in FIG. 4, the bottle 10 can include a grid 26 preventing the marble removal from the bottle. The grid can be made of fabric, plastic, or metal. The grid can be either fixed in the bottle or movable. For example, the movable grid can be dislodged by the movement of a plunger mechanism wherein the grid can be depressed toward the bottom of the bottle, preventing the marble from exiting the bottle and/or impeding the flow of liquid (i.e., the marble after opening is positioned between the grid and the bottom of the bottle). The grid can be constructed as a part of the fixed cap, the plunger, the flexible flanges, or as a separate part. The grid can be combined with various types of plungers, such as the plunger operated by pressure from the user's hand or the plunger activated by twisting the outer cap as disclosed previously herein. FIG. 4 illustrates the grid 26 combined with the hand-operated plunger 28 and the removable cap 30. FIG. 5 illustrates the grid 26 combined with the two-piece plunger mechanism 18 and 19 activated by the twistable cap 12.

The disclosure also includes a mobile application in communication with a controller that allows users to engage with the product or business associated with the product. The mobile application can be activated either by a user action on a user interface of a computer device (e.g., mobile phone, tablet, etc.). Alternatively, or in addition to, the mobile application can be activated by opening the product (e.g., bottle, can, container, packaging). The latter functionality can be achieved by embedding a wireless transmitter into the product that is programmed to transmit a specified signal upon the user opening the product. By way of example, such a transmitter can be embedded into a bottle cap, although it is understood that the transmitter can be embedded into other parts of the product packaging such as the neck or the body of a bottle, the body or the lid of a can, the rigid or flexible container, box, or pouch, the pull tab mounted on a can, the protective materials such as film, foil, and other wrapping materials used in the packaging, among others.

The mobile application can track the progress of the marble dissolution, track the change in intensity of the color and/or flavor change in the drink after opening, explore the "ball drop" effect associated with dislodging of the marble from the flange, or combinations thereof. The mobile application can also include social media features including interactions among the product users, gaming features, and/or product promotion features.

The mobile application may also include features that will allow the business entity that manufactures and/or distributes the product to gather information about the product users. Such information may include but not be limited to the geographical location of the users, date and time of using the product, and/or date and time of using the mobile application.

The mobile application can collect and transmit the data associated with the actions taken by the product users, such as the features of the mobile application they've chosen to engage with, advertisements or promotional content the user chose to watch and/or interact with, user device IDs, IP addresses, and data collected and stored by cookies located on the users' devices.

In addition, the mobile application can obtain and transmit the data identifying the product users and the data identifying the individuals connected to the product users via social networks or other software applications.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

The invention claimed is:

1. A system comprising:
   a controller;
   a memory coupled to the controller, wherein the memory is configured to store program instructions executable by the controller;
   wherein in response to executing the program instructions, the controller is configured to:
   receive an activation information of a product, wherein activation information indicates the product is opened, wherein the product includes:
      a container comprising a container neck extending from a container body, wherein the container neck includes an opening for dispensing the container content, wherein a marble is positioned in the container neck, wherein the marble blocks the opening in the container neck, wherein the marble is held in place by flexible flanges,
      a twistably removable outer cap positioned over the opening of the container neck and a portion of the container neck,
      a fixed cap positioned on an outer surface of the container neck, wherein the twistably removable outer cap threadably engages with the fixed cap, wherein the twistably removable outer cap is configured to be removed from the fixed cap by rotation, and a plunger extending out of the opening of the container neck, wherein upon twisting the twistably removable cap the plunger depresses into the neck container releasing the marble from the flexible flanges and the marble drops into the container body, wherein at least a portion of the marble is dissolvable in the liquid content stored in the container body; and communicate the activation information to a business entity associated with the product.

2. The system of claim 1, wherein the controller is further configured to obtain dissolution information, and communicate the dissolution information to a user interface associated with a mobile device in communication with the user.

3. The system of claim 2, wherein the dissolution information includes color change data, wherein communicating the dissolution information includes displaying the color change data on the user interface of the mobile device.

4. The system of claim 2, wherein the dissolution information includes flavor change data, wherein communicating, the dissolution information includes displaying the flavor change data on the user interface of the mobile device.

5. The system of claim 2, wherein communicating the dissolution information includes interacting with a social media account associated with the user.

6. The system of claim 1, wherein the product further includes at least one sensor configured to detect marble dissolution, wherein the controller is further configured to obtain dissolution information of the marble via the sensor.

7. The system of claim 1, wherein the product further includes a movable grid positioned above the marble and below twistably removable cap, wherein the grid prevents the marble removal from the container.

8. The system of claim 1, wherein the product further includes a movable grid positioned above the marble and below twistably removable cap, wherein the grid prevents the marble impeding the flow of liquid out of the container.

* * * * *